UNITED STATES PATENT OFFICE.

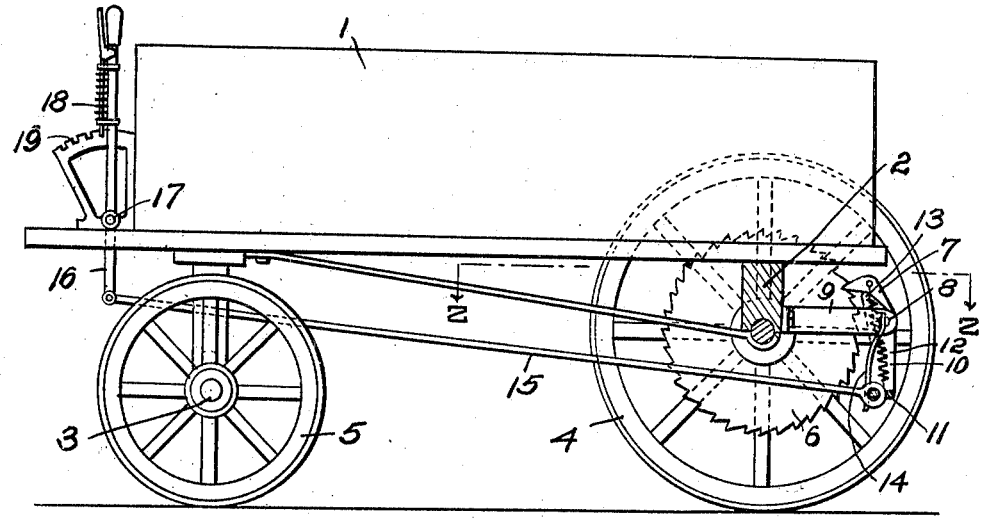
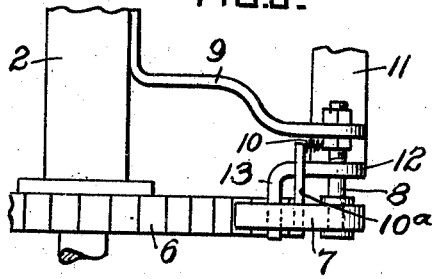
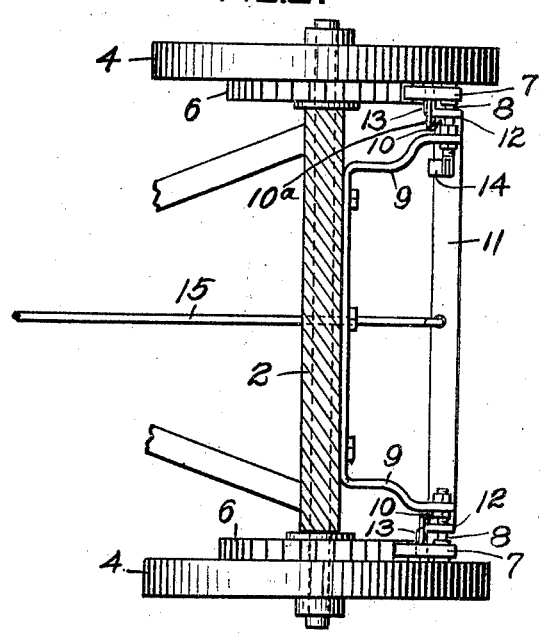
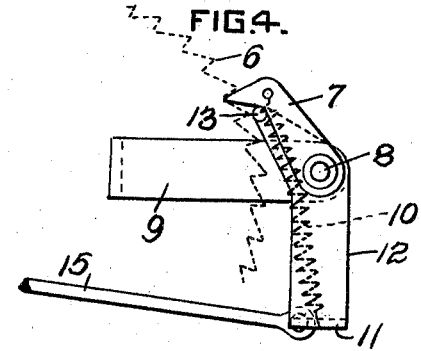

DAVID MIZRUCHY, OF PITTSBURGH, PENNSYLVANIA.

VEHICLE-REVERSE LOCK.

1,399,509.

Specification of Letters Patent.

Patented Dec. 6, 1921.

Application filed April 19, 1920. Serial No. 374,873.

*To all whom it may concern:*

Be it known that I, DAVID MIZRUCHY, a resident of Pittsburgh, in the county of Allegheny and State of Pennsylvania, have invented a new and useful Improvement in Vehicle-Reverse Locks, of which the following is a specification.

This invention relates to vehicles. Its object is to provide means for preventing accidental or undesired backward movement of the vehicle. Generally stated the invention comprises a ratchet plate rotatable with the wheel or wheels, and a detent pivoted to a fixed part of the vehicle and coöperating with the ratchet plate and arranged to prevent rearward rotation of the ratchet plate and vehicle wheels, together with means for holding the detent out of operative engagement with the ratchet plate when desired.

The invention is applicable to any kind of vehicle, either an ordinary wagon, a motor driven road vehicle, and even to railway vehicles, and particularly traction cars.

In the accompanying drawing the invention is shown applied to an ordinary wagon but this is for purpose of illustration merely.

In the drawing Figure 1 is a side elevation of a wagon with one of the rear wheels removed, showing the invention applied thereto; Fig. 2 is a plan view of a portion of the same showing the body omitted to illustrate the operative mechanism; and Figs. 3 and 4 are detail views in enlarged section showing respectively a plan and a side view.

In the drawings 1 indicates the body of the vehicle, 2 the rear axle, 3 the front axle, 4 the rear wheels and 5 the front wheels, all of which parts may be of any desired kind or construction. In the case of a road vehicle the locking means will be applied to the rear wheels and is so shown, but in railway vehicles and the like, the locking means may be applied to any of the wheels of the vehicle.

As shown there is rigidly attached to each of the rear wheels a circular ratchet plate 6, and coöperating with each ratchet plate is a detent 7, which is pivoted at 8 to a bracket 9 fixed to any stationary part of the vehicle, and which detent is held in operative relation to the teeth on the ratchet plate by means of a spring 10, which at one end is attached to a pin 10ª projecting from the detent 7, and at its opposite end to the cross bar 11, hereinafter referred to. The detent and ratchet teeth on the plate are so arranged that when the vehicle travels forwardly the detent merely clicks over the teeth of the ratchet plate, but so that the detent absolutely prevents rearward rotation of the ratchet plate and consequently of the vehicle wheel or wheels.

Means is also provided for moving the detent out of operative relation to the ratchet teeth when it is desired to have the vehicle move backwardly. As illustrated, this means comprises a cross bar or rocking frame 11 having upright end portions 12 pivoted upon the pivots 8 of the two detents, said member being provided with projecting fingers 13 lying just beneath the detents, in such position that when the cross member 11 is rocked on its pivots these fingers engage the detents and lift their ends out of operative relation with the ratchet plates. A suitable spring is provided for normally holding the cross member 11 in such position that the detent will be in operative relation to the ratchet plates. This spring is illustrated as a leaf spring 14 secured to one of the pivot members 8 and bearing against the cross bar or rocking frame 11. A connector, either a bar or wire, cable or the like, 15 extends from the cross bar or rocking frame 11 to one end of lever 16, pivoted at 17 and provided with a suitable locking dog 18 engaging a notched segment 19, located at any convenient place, and by means of which the driver or attendant may rock the member 11 to throw the detents 7 out of operative relation with the ratchet plates 6 so as to permit the vehicle to move backwardly.

The device described can be applied to any form of vehicle. In the case of road vehicles it is preferred to have a ratchet plate and locking detent in connection with each of the rear wheels, although obviously, it will suffice if such means is provided for only one of the wheels. In vehicles in which opposite wheels are fastened to a rotatable axle a single ratchet plate and locking detent will suffice for both.

The means described are of simple construction and are such as to absolutely lock one or more of the vehicle wheels against rearward rotation, thus preventing the vehicle from backing down grade when not desired, and are an obvious safety means. At the same time the locking means can be readily disengaged so as to permit the vehicle to move freely backwardly.

I claim:—

1. In a vehicle, in combination with a vehicle wheel, of a ratchet plate rotatable with the wheel, a detent pivotally attached to a fixed part of the vehicle and arranged to engage the ratchet plate and prevent rearward rotation of said plate and vehicle wheel, a rocking frame pivoted on the detent axis, a projecting finger on said frame arranged to engage the detent and hold it out of operative relation to the ratchet plate, and means for rocking said frame.

2. In a vehicle, in combination with a vehicle wheel, of a ratchet plate rotatable with the wheel, a bracket projecting from a fixed part of the vehicle, a detent pivoted on said bracket and normally biased into engagement with the plate and arranged to prevent rearward rotation of said plate and vehicle wheel, a frame pivotally mounted on the detent axis, a projecting finger on said frame arranged to engage the detent and hold it out of operative relation to the ratchet plate, and means for rocking said frame.

3. In a vehicle, in combination with opposite vehicle wheels, of a toothed plate rotatable with each wheel, a pair of detents mounted on a fixed part of the vehicle and normally biased to engage said toothed plates and prevent rearward rotation of said plates and vehicle wheels, a transverse rocking frame, means carried thereby and arranged when said frame is rocked to engage the detents and hold them out of operative relation to the toothed plates, means biasing said rocking frame to permit the detents to remain in operative relation to the toothed plates, and means for rocking said frame.

4. In a vehicle, in combination with opposite vehicle wheels, of a toothed plate rotatable with each wheel, brackets attached to a fixed part of the vehicle, a detent pivoted on each bracket and normally biased to engage one of the toothed plates to prevent rearward rotation of the same and the vehicle wheel, a transverse frame pivoted to said brackets, means carried by said frame and arranged when the frame is rocked to engage the detents and hold them out of operative relation to the toothed plates, and means for rocking said frame.

In testimony whereof, I have hereunto set my hand.

DAVID MIZRUCHY.

Witnesses:
G. G. TRILL,
HOWARD L. SNIVELY.